United States Patent [19]

Click et al.

[11] 4,250,083

[45] Feb. 10, 1981

[54] VISCOSITY STABILIZED CHLOROPRENE-SULFUR COPOLYMERS

[75] Inventors: Gaylon T. Click, Pearland; Nathan L. Turner, Humble; Edwin F. Hoff, Jr., Pasadena, all of Tex.

[73] Assignee: Denka Chemical Corporation, Houston, Tex.

[21] Appl. No.: 9,109

[22] Filed: Feb. 5, 1979

[51] Int. Cl.³ .................................................. C08K 5/18
[52] U.S. Cl. ............................. 260/45.9 QB; 526/295
[58] Field of Search .............. 260/45.9 QB, 45.9 QA; 526/295

[56] References Cited

U.S. PATENT DOCUMENTS

| | | | |
|---|---|---|---|
| 2,264,173 | 11/1941 | Collins | 526/295 |
| 2,965,604 | 12/1960 | Heinz et al. | 526/295 |
| 3,704,283 | 11/1972 | Mader et al. | 526/295 |
| 3,766,121 | 10/1973 | Fichteman | 526/295 |

*Primary Examiner*—V. P. Hoke
*Attorney, Agent, or Firm*—Kenneth H. Johnson

[57] ABSTRACT

Viscosity stable chloroprene-sulfur copolymers are prepared by polymerizing chloroprene and sulfur in the presence of styrenated diphenyl amine. The presence of this material in the polymerization causes no discernible detriment to or degradation in the other properties of the copolymers.

3 Claims, No Drawings

VISCOSITY STABILIZED CHLOROPRENE-SULFUR COPOLYMERS

BACKGROUND OF THE INVENTION

1. Field of the Invention

This invention relates to viscosity stable chloroprene-sulfur copolymers.

2. Prior Art

"Sulfur modified" neoprenes (so called, but such compositions are in fact copolymers of chloroprene and sulfur) have had and continue to have wide commercial success. The copolymers are prepared by polymerizing chloroprene in an aqueous emulsion in the presence of sulfur as widely described in the art, for example, Whitby, "Synthetic Rubber", 1954, page 770. The chloroprene is polymerized with sulfide linkages in the polymer chains. The product is a high molecular weight, high viscosity polymer, which would not be tractable in ordinary rubber milling and processing equipment.

Generally the product rubber is subjected to a procedure to cause scission of the long molecular chains at the sulfide linkages to reduce the molecular weight of the rubber and produce rubber of the desired viscosity. The process of chain scission has been called "plasticizing" at times, however, it is believed the more appropriate term is peptization.

Tetraethyl thiuram disulfide (TETDS) is the principal peptizing agent and it causes the desired scission of the polymer chains at the sulfide linkages.

A small amount of the TETDS remains in the rubber after peptization. This is advantageous, since it functions to further peptize the rubber during mixing operations, and also improves the processing safety of the rubber.

Unfortunately, the peptization of the rubber is not confined to the mixing step and the reaction continues during storage, and eventually the polymer will become unsuitable for use. Even when it is still useful, the viscosity variation in the same batch of rubber, makes manufacturing use of the rubber difficult. Even costly refrigeration during shipment and storage of the rubber does not overcome this problem, although the process may be slowed.

A wide variety of stabilizers has been added to the rubber to inhibit this decline. For example, U.S. Pat. No. 3,397,173 to Collette et al, solved this problem by employing dialkyl xanthogen disulfide (a chain transfer agent which performs the opposite function of elemental sulfur in that it causes a termination of polymer chains) in the chloroprene-sulfur polymerization. Nonetheless, the patentee also further stabilized the viscosity by adding secondary amines to the latex before isolation of the rubber. Unfortunately, the continued use of this system is questionable, since the dialkyl xanthogen disulfides have been found to constitute a serious health hazard to workers.

Hence, the desirable chloroprene-sulfur copolymer, which is available, is the older type described by Whitby, supra, with its associated problems described by Collette et al. The procedure disclosed by Collette et al employed secondary amine antioxidants with the plasticized rubber, however, many of these compounds were found to cause staining.

The present invention provides a method of providing viscosity stable chloroprene-sulfur copolymer, which requires no further antioxidant treatment of the rubber after polymerization. Another advantage of the present invention is that a simpler "sulfur modified" polychloroprene preparative method is provided.

These and other advantages will be apparent from the following:

SUMMARY OF THE INVENTION

The present invention lies in the process of preparing viscosity stable polychloroprene and in the composition produced by that process.

It has been found that chloroprene-sulfur copolymers, prepared by polymerizing sulfur and chloroprene in the presence of a viscosity stabilizing amount of an organic amine antioxidant have improved storage capacity. A viscosity "stabilizing amount" is understood to mean that amount of organic amine antioxidant which will stabilize the uncompounded copolymer during storage.

More specifically, the hydrocarbylated diphenyl amines are preferably, said hydrocarbyl radical preferably having from 6 to 18 carbon atoms. The hydrocarbyl radical may include aromatic, cyclic and acyclic hydrocarbon radicals.

Specific organic amine antioxidants include styrenated diphenyl amine, octylated diphenyl amine and nonylated diphenyl amines.

In one aspect, the invention may be described as an improvement in the process of preparing a chloroprene-sulfur copolymer which comprises polymerizing chloroprene and sulfur in an emulsion polymerization wherein the improvement comprises having present during the polymerization from about 0.1 to 2.0 and preferably about 0.25 to 0.75 parts by weight of hydrocarbylated diphenyl amine per hundred parts of monomer. The hydrocarbylated diphenyl amine was found not to interfer in the reaction and to produce no discernible degradation of the polymer product. The polymer product was, however, improved in that the peptized polymer exhibited greater stability than a polymer produced without the hydrocarbylated diphenyl amine.

The polymerization is entirely conventional for producing the chloroprene-sulfur copolymers. The term "polymers of chloroprene" or "chloroprene-sulfur copolymers" encompasses polymers in which chloroprene is the major or predominant monomer. Organic comonomers may also be employed such as 2,3-dichloro-1,3-butadiene; acrylonitrile, methyl methacrylate and so forth. Usually, the total amount of comonomers will represent no greater than 25 mol percent of the total monomers and preferably will constitute less than 15 mol percent of the total monomers including chloroprene. The polymerization of chloroprene in aqueous emulsion is well known and any such system which does not interfere with the novel characteristics of this invention can be employed. Processes and methods for the polymerization and recovery of chloroprene are disclosed, for example, in the "Encyclopedia of Polymer Science and Technology," Vol. 3, page 705–730 (Interscience, 1965) and in numerous patents such as U.S. Pat. Nos. 2,264,173 and 2,264,191 both issued on Nov. 25, 1941 and Whitby supra. The polymerization may be conducted either batchwise or continuously.

Conventional emulsifiers may be employed such as the salts of rosins and rosin derivatives such as tall oil rosin (or resin), wood rosin, disproportionated rosin or hydrogenated rosin; ammonium, sodium or potassium salts of long chain fatty acids; nonionic surface active agents such as the ethylene oxide or propylene oxide condensation products of compounds containing reactive hydrogen atoms. Additional emulsifying agents are disclosed in U.S. Pat. No. 2,264,173. In this specification rosin or rosinates include the various commercial rosins, the dehydrogenated rosins and disproportionated rosins and salts thereof. Rosin base emulsifiers are well known to the art. A particularly preferred rosin emulsifier is wood rosin (unmodified except for clean-up and sold by the Reichhold Chemicals, Inc. as Nancy-Wood Rosin).

The pH of the aqueous emulsion for polymerization may be varied depending upon the particular emulsification system employed and can be acidic, neutral or alkaline; however, it is preferred to have a pH in the range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiarybutyl isopropylbenzene hydroperoxide, azo catalysts such as alpha-alpha'-azo-bis-isobutyronitrile and the like. Suitable inorganic peroxides are salts of inorganic per acids including persulfates, perborates or percarbonates e.g., ammonium or potassium persulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The polymerization is carried out in the presence of elemental sulfur to produce a chloroprene-sulfur copolymer. Any form of sulfur may be used but a form which is soluble in the polymerizable compounds (monomer*) is preferred, for example, ordinary rhombic sulfur. It may be dissolved in the polymerizable compounds before their emulsification or may be introduced into them by any other suitable means. When high proportions of sulfur are desired, it is advantageous to dissolve the sulfur in a solvent such as carbon disulfide or a highly chlorinated naphthalene. The sulfur may also be added to the water phase in the form of an aqueous dispersion, provided the conditions are such that a substantial amount of the sulfur dissolves in the chloroprene before the polymerization begins.
The terms "monomer" or "polymerizable compounds" as used herein include the organic compounds but excludes sulfur even though it does enter into the polymer chain.

Amounts of sulfur as low as 0.1% or less based on polymerizable compounds may be used up to the maximum proportion soluble in the non-aqueous phase under the conditions of the polymerization. The benefits of the present invention are obtained in the preferred range of 0.2 to 0.8 parts of sulfur per 100 parts of monomer, more preferably 0.4 to 0.65 parts thereof.

Suitable peptizing agents include compounds of the general structure R—S—$R_1$ where R is alkyl, aryl, thiazal, thiocarbamyl, aromatic acyl or aromatic thioacyl group and $R_1$ is hydrogen, a base forming radical or a group represented by—$S_n$—$R_2$, in which n is a whole number of less than 6 and $R_2$ is one of the group represented by R above.

The peptizing agents generally are compounds containing the nucleus:

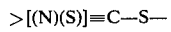

which group is characterized by having a central carbon, one of the valences of which is satisfied by a sulfur atom and the other three valences of which are satisfied by a nitrogen atom and a sulfur atom together. The peptizing agent currently in widest use is tetraethyl thiuram disulfide (TETDS). Other members of this group of compounds are: phenylethyl-carbamyl-dimethyl-dithiocarbamate; dimethyl-thiocarbamyl-thioacetylesulphide; dimethyl-thiocarbamyl-nitrophenyl-disulphide; benzothiozyl-dimethyl-dithiocarbamate; benzothiazyl-dimethyl-carbamyl-sulphide; benzothiazyl-furoylsulphide; mercapto-benzothiazol; tetrabutyl-thiuram-monosulphide; tetramethyl-thiuram-disulphide; dipentamethylene-thiuram-tetrasulphide; dimethyl carbamyl dimethyl dithiocarbamate; dinitro phenyl pentamethylene dithiocarbamate; dipentamethylene thiuram disulphide; benzyl pentamethylene dithiocarbamate; diphenyl diethyl thiuram disulfide; phenyl dibutyl dithiocarbamate; tolyl phenyl ethyl dithiocarbamate; b-phenyl ethyl xylyl methyl dithiocarbamate; p-diphenyl diisoamyl dithiocarbamate; propyl dicetyl dithiocarbamate; crotonyl dicylohexyl dithiocarbamate; cetyl naphthyl methyl dithiocarbamate; b-naphthyl dipropyl dithiocarbamate; decyl benzyl ethyl dithiocarbamate; benzoyl diethyl dithiocarbamate; acetyl phenyl methyl dithiocarbamate; dibutyl carbamyl phenyl propyl dithiocarbamate; p-acetyl phenyl sulfur diallyl dithiocarbamate; 2-chloro-1-naphthyl sulphur dimethyl dithiocarbamate; dinaphthyl dimethyl thiuram monosulphide; dichlor diphenyl diethyl thiuram monosulphide; dinitro diphenyl dipropyl thiuram monosulphide; pehnyl sodium sulphonate diethyl dithiocarbamate; nitro ortho diphenyl dimethyl dithiocarbamate; dipenthamethylene thiuram monosulphide; nitro naphthyl pentamenthylene dithiocarbamate; dinitro diphenyl dibutyl thiuram disulphide; distearyl dimethyl thiuram disulphide; tetracetyl thiuram disulphide; dinaphthyl dimethyl thiuram disulphide; tetraisopropyl thiuram tetra sulphide; tetrabrom diphenyl dimethyl thiuram tetra sulphide; tetrabutyl thiuram disulphide; potassium nitro benzothiazyl mercaptide; ammonium chloro nitro benzothiazyl mercaptide; ethyl benzothiazyl sulphide; cetyl benzothiazyl sulphide; crotonyl benzothiazyl sulphide; benzyl benzothiazyl sulphide; tolyl benzothiazyl sulphide; dinitro phenyl benzothiazyl sulphide; dibrom phenyl benzothiazyl sulphide; b-naphthyl benzothiazyl sulphide; nitro p-diphenyl benzothiazyl sulphide; benzoyl benzothiazyl sulphide; acetyl benzothiazyl sulphide; methyl tolyl carbamnyl benzothiazyl sulphide; phenyl benzothiazyl disulphide; tetrabutyl thiocarbamyl benzothiazyl sulphide; chloro phenyl propyl thiocarbamyl nitro benzothiazyl sulphide; dinitro dibenzothiazyl disulphide; nitro dibenzothiazyl disulphide and chlor dinitro dibenzothiazyl disulphide.

Other specific classes of peptizing agents which are operable to obtain the chain scission, include dialkyl xanthogen disulfide, and polysulfide of the general structure $R_3$—$S_m$—$R_4$ where $R_3$ and $R_4$ are hydrocarbon radicals having 1 to 8 carbon atoms or hydrogen, at least one of $R_3$ or $R_4$ being a hydrocarbon radical and m is 2 to 4, for example diethyl xanthogen disulfide, diisopropyl xanthogen disulfide, di(o-ethyl dithiocarbonoxy), sulfide and di(o-ethyl dithiocarbonoxy)disulfide.

Although the improvement in the present chloroprenesulfur copolymers is demonstrated in the peptized product, the invention in the first instance, lies in the improvement in the process of producing the copolymer and the copolymer, per se, although the peptization and peptized copolymers are a further aspect of the invention.

Although styrenated diphenyl amine and other secondary amines are known as antioxidants for polychloroprene-sulfur rubbers, i.e., to be added to the rubbers, the addition of styrenated diphenyl amine to the polymerization of chloroprene and sulfur with the production of a rubber which has no discernible degradation and which has superior viscosity stability is novel and unobvious. By this improvement in the chloroprene-sulfur manufacturing process the stabilization procedure is simplified and a stable rubber comes out of the reactor without further treatment.

DETAILED DESCRIPTION AND PREFERRED EMBODIMENTS

The temperature of polymerization may be varied depending upon the particular type of polymer being produced with suitable ranges being from 0° C. to 90° C. and the preferred range being between 15° C. and 55° C. The polymerization may be short stopped by the addition of agents such as paratertiarybutyl catechol and thiodiphenylamine. The process of polymerization may be either continuous or may be conducted in batch.

Preferably, the polymerization would be conducted in an oxygen free or substantially oxygen free atmosphere such as in an inert gas. However, in some polymerization processes, as known in the prior art, a controlled amount of oxygen may be employed.

In the following examples, parts are by weight and in the polymerization charge the parts are based on 100 parts by weight of polymerizable monomer.

EXAMPLES 1–3

Example 1 is a control carried out without the hydrocarbylated diphenyl amine as a polymerization component. Examples 2 and 3 are carried out with 0.5 and 0.75 parts by weight of the styrenated diphenyl amine respectively.

Each batch of chloroprene-sulfur copolymer was prepared by charging the following components into a reactor with 150 parts by weight of water:

| Component | Parts by weight based on Monomers |
|---|---|
| Chloroprene | 100.00 |
| Sodium hydroxide (100%) | 0.775 |
| Sodium phosphate (Na$_3$PO$_4$) | 0.300 |
| Sodium salt of condensate of formaldehyde and naphthalene sulfonic acid | 0.718 |
| N-wood rosin | 5.000 |
| Sulfur | 0.500 |

Styrenated diphenyl amine as (indicated in Table I). A pumped catalyst in the relative proportions of water 95.4%, potassium persulfate 4.5% and sodium anthroquinone β-sulfonate 0.115% was continuously added to maintain the polymerization. The reaction was carried out at 40° C. for about 5 hours to about 84% conversion when a short-stop was added.

The pH of the latex solution was adjusted to about 10.7 with acetic acid and it was peptized with tetraethyl thiuram disulfide for about 5 hours at 40° C. and the rubber isolated by freeze roll. The results of various physical test on the raw copolymer are set out in Table I.

TABLE I

| Example | 1 | 2 | 3 |
|---|---|---|---|
| Styrenated diphenyl amine,* parts by weight | 0 | 0.5 | 0.75 |
| Mooney Viscosity, ML 1+2½/4 | | | |
| Original | 52.5/46.5 | 60/54.5 | 48/43 |
| 3 days aged @ 50° C. | 45/41 | 56/51.5 | 49/45 |
| 7 days aged @ 50° C. | 38/35 | 50.5/47 | 49/45 |
| Δ 3 days | −7.5 | −4 | +1 |
| Δ 7 days | −14.5 | −9.5 | +1 |
| Compound Viscosity, ML 1+2½/4 | 61/58 | 58/55 | 61.5/58 |
| Mooney Scorch, 5 pt Rise (min) | 42 | 48 | 43.3 |
| % Compression set, 22 hrs at 212° F. | 36.6 | 39.5 | 37 |
| Tensile Properties | | | |
| Shore A hardness, pts. | 61 | 61 | 61 |
| 300% modulus, psi | 1345 | 1380 | 1330 |
| 600% modulus, psi | 2745 | 2770 | 2750 |
| Tensile strength, psi | 2950 | 3010 | 2950 |
| % elongation | 690 | 690 | 675 |
| Monsanto Rheometer 320° F. | | | |
| Min. torque, inch-pounds | 5.5 | 6.3 | 6.0 |
| Scorch, 2 in-lb rise, (min) | 4.6 | 4.5 | 4.5 |
| Torque at 30 min, inch-pounds | 48.6 | 49.2 | 49.5 |
| opt. cure, torque, inch-pounds | 44.3 | 44.9 | 45.2 |
| opt. cure, time (min) | 12.3 | 12.5 | 13.5 |
| Tear Strength | | | |
| die C, lbs./in. | 382 | 372 | 381 |
| Air Oven Aged Tensiles | | | |
| 7 days @ 212° F. | | | |
| pt. change, Shore A hardness | +9 | +10 | +8 |
| % change, 300% modulus | +68 | +55.5 | +63.5 |
| % change, tensile strength | −1.5 | −5 | −2.5 |
| % change, elongation | −36 | −34 | −34 |

*WINGSTAY 29 product of Goodyear Tire & Rubber Company, Akron, Ohio.

EXAMPLE 4

A commercial chloroprene-sulfur copolymer, designated under the tradename S-3, Denka Chemical Corporation was prepared containing 0.50 parts by weight styrenated diphenyl amine based on chloroprene as the only antioxidant. The following properties were recorded on a sample and reported in Table II.

TABLE II

| Mooney Viscosity, Raw Polymer | |
|---|---|
| Original Ml 1 + 2½/4 | 46.5/42.5 |
| 3 days @ 50° C. Ml 1 + 2½/Δ | 42.5/−4 |
| 7 days @ 50° C. Ml 1 + 2½/Δ | 43.5/−3 |
| BIN STORAGE STABILITY TEST*: | |
| Compound, Samples Aged at 100° F. | |
| Compound Mooney Viscosity | |
| Original ML 1 + 2½/4 | 46/43 |
| 1 week Ml 1 + 2½/Δ | 45/−1 |
| 2 weeks Ml 1 + 2½/Δ | 46/0 |
| 3 weeks Ml 1 + 2½/Δ | 47/+1 |
| 4 weeks Ml 1 + 2½/Δ | 50.5/+4.5 |
| % Compression set | |
| 7 days @ −10° C. | 83.5 |
| 22 hours @ 212° F. | 63.5 |
| Tensile Properties | |
| Shore A hardness, pts. | 61.5 |
| 300% modulus, psi | 1280 |
| 600% modulus, psi | 2325 |
| Tensile strength, psi | 2600 |
| % elongation | 720 |
| Monsanto Rheometer, 320° F. | |
| Min torque, inch-pounds | 3.7 |
| Scorch, 2 inch-pound rise, (Min) | 3.5 |

TABLE II-continued

| | |
|---|---|
| Torque @ 30 min, inch-pounds | 37.6 |
| Opt. cure torque, inch-pounds | 39.2 |
| Opt. cure time, min | 8.8 |
| Extrusion | |
| Rate, inch/min | 109 |
| Output, gram/min | 55 |
| % Die swell | 85 |
| Tear Die C, lbs./in. | 490 |
| Mill Tack (0=no tack, 10=very tacky) | 4 |

*S3 Test Recipe

| Ingredients | Parts by Weight |
|---|---|
| Neoprene S3 | 100.0 |
| Magnesia | 4.0 |
| Stearic Acid | 1.0 |
| Octylated diphenylamine | 2.0 |
| N-550 Carbon Black | 20.0 |
| N-762 Carbon Black | 20.0 |
| Sundex-790(1) | 5.0 |
| Zinc Oxide | 5.0 |
| MBTS(2) | 2.0 |
| Poly-Dispersion END-75(3) | 1.0 |

(1) Aromatic process oil, supplied by Sun Oil Co.
(2) 2,2'-Benzothiazyl disulfide, supplied by American Cyanamid.
(3) 2-Mercaptoimidazoline in an EPR binder (75% active), supplied by Wyrough and Loser, Inc.

EXAMPLES 5-8

A second commercial product designated as S-5 (chloroprene-sulfur copolymer) and produced by Denka Chemical Corporation with 0.50 parts by weight styrenated diphenyl amine*, present in the polymerization, was evaluated in a gum stock formulation and in a carbon black formulation with a control which was polymerized without the styrenated diphenyl amine.
*Wingstay 29, Goodyear Tire & Rubber Co., Akron, Ohio The gum stock formulation is:

| Ingredients | Parts by Weight |
|---|---|
| Neoprene S5 | 100.0 |
| Stearic Acid | 0.5 |
| Magnesia | 4.0 |
| Zinc Oxide | 5.0 |

The carbon black stock formulation is:

| Ingredients | Parts by Weight |
|---|---|
| Neoprene S5 | 100.00 |
| Octylated Diphenylamine | 2.0 |
| Magnesia | 4.0 |
| Stearic acid | 0.5 |
| Carbon black, N-660 | 29.0 |
| Zinc Oxide | 5.0 |

The gum stock evaluations are set out in Table III and the carbon black stock evaluations are set out in Table IV.

TABLE III

| S-5 Gum Stock | | |
|---|---|---|
| Example | 5 | 6 |
| Styrenated diphenyl amine, parts by weight | 0(Control) | 0.50 |
| Mooney Viscosity, Ml 1 + 2½/4 | | |
| Original | 55.5/50 | 47/42 |
| Aged 3 days @ 50° C. | 51/47.5 | 46/42.5 |
| Aged 7 days @ 50° C. | 45.5/43.5 | 45.5/42.5 |
| Compound Viscosity Ml 1 + 2½/4 | 37/35 | 34/32.5 |
| Mooney Scorch @ 250° F., 5 pt rise | 56.8 | 48.0 |
| Compression Set, 22 hrs. @ 212° F. | 57.8 | 58.3 |
| Tensile Properties | | |
| Shore A hardness, pts | 45.4 | 46.0 |
| 300% Modulus, psi | 240 | 245 |
| 600% modulus, psi | 600 | 605 |
| Tensile strength, psi | 4155 | 4045 |
| % Elongation | 790 | 790 |
| Monsanto Rheometer, 320° F. | | |
| Min torque, inch-pounds | 4.2 | 4.0 |
| Scorch, 2 inch-pound rise (min) | 5.5 | 5.5 |
| Torque @ 30 mins, inch-pounds | 31.0 | 30.6 |
| Opt. cure torque, inch-pounds | 28.3 | 27.9 |
| Opt. cure time, min | 9.6 | 9.6 |

TABLE IV

| S-5 Carbon Black Stock | | |
|---|---|---|
| Example | 7 | 8 |
| Styrenated diphenyl amine | 0(control) | 0.50 |
| Mooney Viscosity, Ml 1 + 2½/4 | | |
| Original | 54/48 | 43/39 |
| Aged 3 days @ 50° C. | 49/45 | 44/40.5 |
| Aged 7 days @ 50° C. | 43.5/41 | 42.5/39.5 |
| Compound Viscosity, ML 1 + 2½/4 | 58.5/55.5 | 60/57 |
| Mooney Scorch, 10 pt rise | 46.3 | 48.5 |
| Compression set, 22 hrs. @ 212° F. | 47.9 | 47.9 |
| Tensile Properties | | |
| Shore A hardness, pts | 60.5 | 60.0 |
| 300% modulus, psi | 1150 | 1130 |
| 600% modulus, psi | 2575 | 2525 |
| Tensile strength, psi | 2895 | 2940 |
| % Elongation | 730 | 775 |
| Tear strength, Die C, psi | 400 | 415 |
| Monsanto Rheometer | | |
| Min torque, inch-pounds | 6.4 | 6.1 |
| Scorch time, 2 inch-pound rise(min) | 3.5 | 4.1 |
| Torque @ 30 mins, inch-pounds | 49 | 47.9 |
| Opt. cure torque, inch-pounds | 44.7 | 43.7 |
| Opt. cure time, min | 13.5 | 13.3 |

The present invention provides a significant improvement in procedure for the preparation of viscosity stable chloroprene-sulfur copolymer, by using available, safer materials and a simplified method.

The invention claimed is:

1. A process for preparing chloroprene-sulfur copolymers having improved viscosity stability comprising
   polymerizing chloroprene and from 0.2 to 0.8 parts of sulfur by weight per hundred parts of monomer in an aqueous emulsion in the presence of a catalyst consisting essentially of organic or inorganic peroxides and about 0.25 to 0.75 parts by weight of a styrenated diphenyl amine per hundred parts of monomer at a temperature in the range of 15° to 55° C. to a desired conversion,
   peptizing the product of the polymerization and,
   recovering a product copolymer having a reduced and stabilized viscosity.

2. The process according to claim 1 wherein the peptizing agent comprises tetraethyl thiuram disulfide.

3. The process according to claim 1 wherein the sulfur is present in the range of 0.4 to 0.65 parts by weight per hundred parts of monomer.

* * * * *